US010694361B2

(12) United States Patent
Lenchner et al.

(10) Patent No.: US 10,694,361 B2
(45) Date of Patent: Jun. 23, 2020

(54) COMPUTER-IMPLEMENTED AGENT ASSISTED ELECTRONIC BUSINESS CARDS (71) Applicant: International Business Machines Corporation, Armonk, NY (US)

(72) Inventors: Jonathan Lenchner, Nairobi (KE); Toby Kurien, Midrand (ZA); Reha Yurdakul, Istanbul (TR); Sekou L. Remy, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/157,819

(22) Filed: Oct. 11, 2018

(65) Prior Publication Data
US 2020/0120467 A1 Apr. 16, 2020

(51) Int. Cl.
*H04B 7/00* (2006.01)
*H04W 4/80* (2018.01)
*H04B 5/00* (2006.01)
*H04W 8/00* (2009.01)

(52) U.S. Cl.
CPC ............ *H04W 4/80* (2018.02); *H04B 5/0031* (2013.01); *H04W 8/005* (2013.01)

(58) Field of Classification Search
CPC ....... H04W 4/80; H04W 8/005; H04B 5/0031
See application file for complete search history.

(56) References Cited

U.S. PATENT DOCUMENTS

| 5,493,105 A * | 2/1996 | Desai ..................... G06K 13/08 235/375 |
| 7,130,826 B1 * | 10/2006 | Lenchner ............... G06Q 20/10 705/39 |
| 8,947,547 B1 * | 2/2015 | Millikan ............ H04N 1/00156 348/211.1 |
| 9,621,252 B2 | 4/2017 | Sarda et al. |
| 9,667,810 B1 | 5/2017 | Brown |
| 9,760,645 B1 * | 9/2017 | Park ................. G06K 19/06037 |
| 9,922,124 B2 | 3/2018 | Rathod |
| 9,923,852 B2 | 3/2018 | Smith et al. |
| 2005/0233784 A1 * | 10/2005 | You ..................... H04M 1/0214 455/575.3 |
| 2008/0125148 A1 * | 5/2008 | Zhao ................... H04M 1/2757 455/466 |

(Continued)

FOREIGN PATENT DOCUMENTS

JP 2014-170382 A 9/2014

OTHER PUBLICATIONS

Maina, A., "10 Apps for Creating a Digital Business Card", Small Business Trends, https://smallbiztrends.com/2017/04/digital-business-card.html, Apr. 6, 2017, Accessed on Oct. 11, 2018, 7 pages.

*Primary Examiner* — Md K Talukder
(74) *Attorney, Agent, or Firm* — Scully, Scott, Murphy & Presser, P.C.; Eyal Gilboa (57) ABSTRACT

A physical device may include an embedded microprocessor and memory. The memory is loadable with information associated with a holder of the card device. The microprocessor communicates with another device responsive to detecting said another device is within a threshold proximity. The microprocessor further may negotiate for exchanging of the information with said another device based on current context.

20 Claims, 8 Drawing Sheets

(56) References Cited

U.S. PATENT DOCUMENTS

| | | | |
|---|---|---|---|
| 2012/0209744 A1* | 8/2012 | Mullen | G06Q 30/0641 |
| | | | 705/26.41 |
| 2013/0217365 A1* | 8/2013 | Ramnani | H04L 67/306 |
| | | | 455/414.1 |
| 2013/0227037 A1 | 8/2013 | Wayans | |
| 2013/0267171 A1* | 10/2013 | Sarkar | G06Q 10/00 |
| | | | 455/41.1 |
| 2014/0098073 A1* | 4/2014 | Singh | G06F 1/3231 |
| | | | 345/179 |
| 2014/0263627 A1* | 9/2014 | Wyatt | G06Q 20/385 |
| | | | 235/380 |
| 2014/0282961 A1* | 9/2014 | Dorfman | H04L 63/0823 |
| | | | 726/7 |
| 2014/0287723 A1* | 9/2014 | LaFever | G06Q 30/0271 |
| | | | 455/411 |
| 2016/0048709 A1* | 2/2016 | Butler | H04L 67/1097 |
| | | | 340/10.51 |
| 2016/0143004 A1* | 5/2016 | Stromberg | G06Q 20/32 |
| | | | 370/329 |
| 2017/0064433 A1* | 3/2017 | Hirsch | H02J 7/025 |
| 2018/0233225 A1* | 8/2018 | Experton | G16H 40/20 |

* cited by examiner

COMPUTER-IMPLEMENTED AGENT ASSISTED ELECTRONIC BUSINESS CARDS

BACKGROUND

The present disclosure relates generally to computers and computer applications, and more particularly to electronic business card devices and methods thereof.

In a typical conference setting, people may meet and exchange their contact information, for example, by exchanging business cards or other identifying information, in manual or electronic manner. While exchanging business cards or the like may allow for making lasting contacts, it may be difficult to recall at a later time which business card to associate with which person, particularly, for example, if business cards were exchanged in a populated environment such as large conferences, where the meeting among the people only lasted for a short duration. As another example, in such large conference settings, it may be not possible to meet and exchange business cards with everyone, or everyone one would ideally like to meet, in the first place.

BRIEF SUMMARY

An apparatus and method may be provided, which for example, automatically detects proximity of another device and triggers sharing of information based on one or more criteria or context. In one aspect, an apparatus comprising an electronic card device may include an embedded microprocessor and memory. The memory may be loadable with information associated with a holder of the electronic card. The microprocessor may be operable to communicate with another device responsive to detecting said another device is within a threshold proximity. The microprocessor may be further operable to share at least some of the information with said another device based on current context.

A method, in one aspect, may include communicating, by an electronic card device with an embedded microprocessor and memory, with another device responsive to detecting said another device is within a threshold proximity. The memory of the electronic card device may be loadable with information associated with a holder of the electronic card. The method may also include the electronic card device automatically sharing at least some of the information with said another device based on current context.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A physical business card, electronic card or like device, and method thereof are disclosed, which in some embodiments allow for establishing contacts, in automated or semi-automated manner, among individuals carrying such devices who for example may have overlapping interests. The contacts may then be organized in a meaningful way so that an individual can readily follow up with an established contact. In another aspect, the automated physical business card like device may allow for storing additional data such as a recent photo or another item associated with the contact who gave or exchanged the business card, for example, to assist in recalling the context of the meeting with or establishing of the contact.

In some embodiments, the business card device can take the form of a self-contained electronic card-like device. In another embodiment, the business card device may be implemented as an application (app) on a smartphone or the like. One card or a phone detecting the proximity of another card or phone may trigger the cards or phones to exchange electronic information, and the actual exchanging of information between the cards or phones may take place, for example, wirelessly via a wireless communication.

In some embodiments, the electronic information shared includes basic contact information. Other information such as a photograph, areas of interest and matching criterion or criteria may be shared. In some embodiments, a computer-implemented agent may filter or negotiate sharing or exchanging of information based on one or more criteria. Examples of criteria may include, but are not limited to, areas or subjects of interest, job title or role, an individual with one or more specific specialties (for example, technical specialty), or others. The computer-implemented agent may be resident and running on an electronic card device (also referred to as a business card device). In another aspect, the computer-implemented agent may be running on a remote computer system, for example, in a cloud computing environment, communicating with an electronic card device and acting on behalf of the electronic card device. In some embodiments, exchanging information such as a phone number may require a negotiation or permission.

In some embodiments, when information is shared with a fellow meeting participant or attendee, and the fellow meeting participant or attendee in turn exchanges information with someone else via their business card device, and that someone else has sufficient overlapping interests as specified by the matching criteria or criterion, the information about this new person is sent to the original person, for instance, with a permission from the new person to disseminate the information. Such permission or authorization may be specified and included as part of the criteria. If this new person meets additional people with enough overlapping interests that exceed the first person's matching criteria, such a person's contact information and interests with the permission of the person, are relayed to the first person, and so on. In this way any party to a meeting or conference can effectively meet everyone in the meeting or conference with matching interests beyond a prescribed threshold. The virtually met individuals may then be prioritized for follow up based on the number or amount of the prescribed matching conditions.

In some embodiments, the matching criteria need not be symmetrical. For instance, one card device may store very strict matching criteria (e.g., specifically or narrowly prescribed interests such as specific areas of technology) associated with a party, while a card device associated with another meeting attendee may store general broad interest criteria, which may include virtually any meeting participant or attendee. In some embodiments, the person giving up information may only be willing to give up their information if the overlap in interests exceeds their own threshold rather than just that threshold of the receiver. In other cases, meeting goers may wish not to exchange their information unless they have personally met a given individual. Thus, respective card devices may store and function according to different criteria associated with particular users. The card device and method thereof may support all such users' criteria and their exchange of information requirements. Additionally, a given individual's criteria (thus criteria associated with the card device associated with that individual) may specify that the individual information be given in exchange of a micropayment, for example to avoid bulk advertising.

In some embodiments, a business card device may be a separate device such as an electronic business card, which includes a processor, memory and a power source such as a battery. A self-contained electronic business card may start by detecting the addition of a new near field device and immediately begin a sequential exchange of information. In some aspects, a user need not take the device out of a pocket or a bag for this exchange to take place.

In some embodiments, to avoid accidentally collecting contacts via proximity, the device can be implemented with a button or other actuator to initiate contact exchange. The device also can be implemented with a sensor to detect a motion such as shaking of the device, in order to initiate contact exchange. For instance, a user may shake the device to wake it up (and in the process potentially impart power to the device). Yet in another aspect, the device can be implemented to detect tapping and/or being within a few millimeters of one another, and in response initiate contact exchange. The device can also synchronize with a user's smartphone via a wireless technology such as Bluetooth.

In another embodiment, business card devices may be implemented to exchange tokens. The tokens then may be communicated to or returned to another computer or system, which may act on the tokens, for example, send contact information associated with the tokens to a device associated with the holder of the business card device. For example, business card devices may be distributed to users attending a conference, and implemented to exchange tokens. In one aspect, the business card devices may be implemented to exchange tokens within a defined perimeter where the conference is taking place. When the business card devices are returned to the registration desk of the conference, a reader device may download the collected tokens, cross-reference the tokens with the registration database, and then send the collected contacts, as well as other contacts matching the user's criterion or criteria, to the user. In one aspect, this final transfer may occur via e-mail, short message service (SMS), an app, or another service or method.

Figure 1:
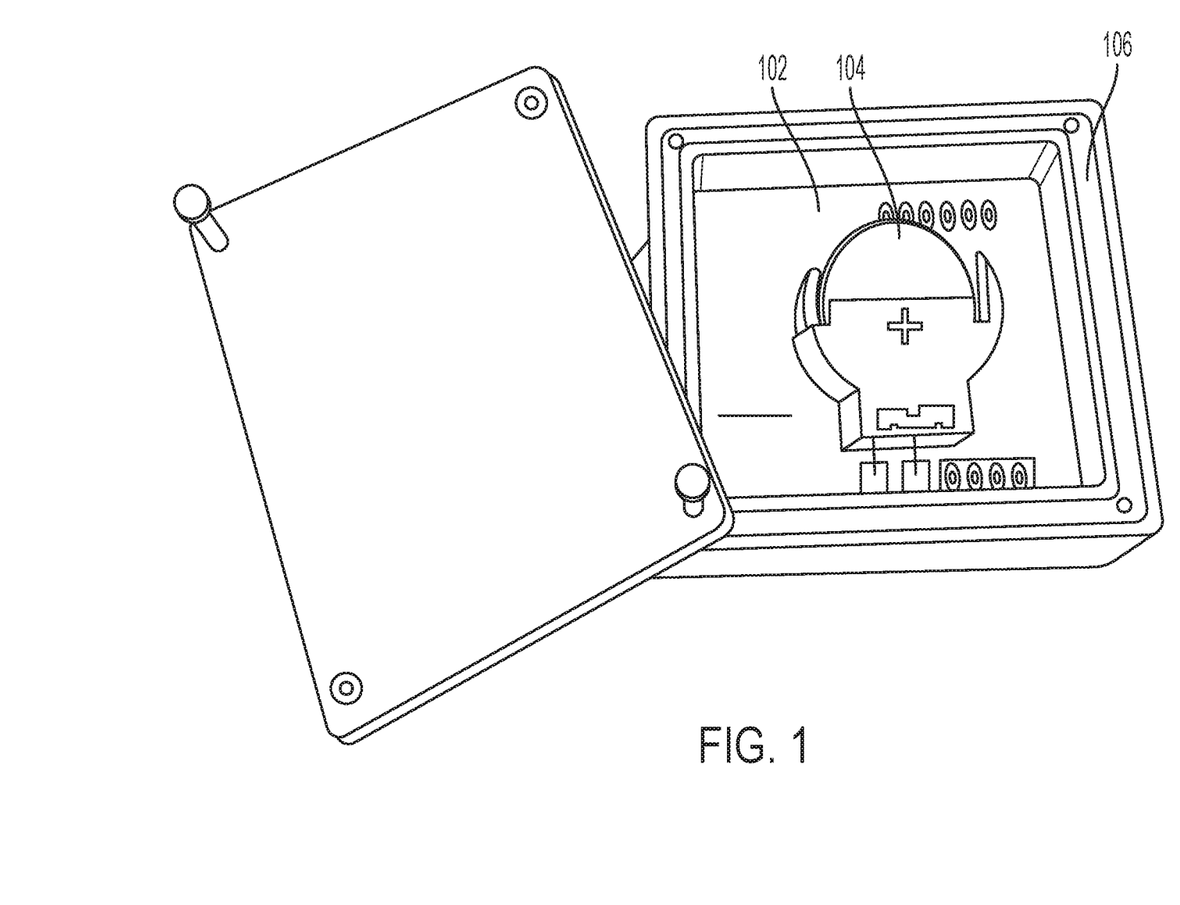
FIG. 1 is a diagram illustrating an example e-business card with battery in plastic casing in one embodiment.

FIG. 1 is a diagram illustrating an example e-business card in one embodiment with battery in a plastic casing. The card 102 may include one or more receptacles for power sources such as self-contained lithium-ion batteries 104. A casing 106 may enclose the card 102. The card 102 is encoded with program instructions to exchange information and/or tokens. The card 102 may be equipped with a sensor that can detect proximity of another such card.

The card 102 may electronically transfer contact information and may also transfer other biographical information upon close contact with another card. The degree of information details being exchanged may be negotiated between the cards, e.g., based on one or more criteria stored by the card or retrieved by the card. In one aspect, a greater amount of contact information may be exchanged based on a degree of similarity of interests discovered of the holders of the cards 102. A processor on the card 102 may run a computer-implemented agent, which may communicate with a neutral third party agent (e.g., running on a remote computer system), providing information associated with a holder of the card 102 to the neutral third party agent. The neutral third party agent may determine the degree or level of commonality between the card 102 and another card or device in proximity, and report back the degree of commonality to the agent running on the card 102 or on behalf of the card 102. Based on the level of commonality, the agent of the electronic card device 102 determines what information to share and provides the information to the neutral third party agent. The neutral third party agent may then communicate the shared information to said another card or device in proximity. As described above, in another aspect, the computer-implemented agent may reside and run remotely on behalf of the card 102 and communicate with the processor of the card 102. Yet in another aspect, direct negotiation for sharing of information may be performed between computer-implements agents of respective electronic card devices, for example, without a third party agent.

Electronically transferring contact and biographical information allows for the contacts of one party to be shared with another party based on consent of those parties and further agent based negotiations establishing common interests. In one aspect, contact information contained on or linked to the physical business card-like device may be uploaded, for example, using a wireless technology standard such as Bluetooth, to a paired smartphone or like device, responsive to establishing proximity of the two devices. In another aspect, contact information contained on the physical business card-like device may be uploaded to another device on an as-needed basis, for instance, via a wireless communications or another communication method.

In one aspect, a physical business card-like device may receive a relatively small amount of energy upon being shaken, responsive to which the physical business card-like device wakes and tries to then establish contact with another device or tries to upload information from that device via a wireless communication technology such as Bluetooth, or both. In one aspect, providing information may be done in return for a payment.

In other embodiments, a business card device may be implemented with smartphone technology using wireless technology for exchanging data over short distances from devices such as Bluetooth technology. For instance, an app may be implemented and deployed on a mobile or smartphone device and perform the functions of a business card device. Smartphone or mobile devices may automatically pair with one another for detection and communication of information. Transferring of information may be accomplished via an app running on a smartphone. A proximity detection sensor on the smartphone may detect proximity to another user's device or smartphone and initiate transferring of the information, for example, based on one or more matching criteria.

In still other embodiments, upon detection of proximity with another device, an app on a smart or mobile device may display a Quick Response Code (QR-code) or the like that encodes a web site providing the user's information and then automatically initiate or start the sequential exchange of information with the other device. The near field information exchange may be made seamless as apps on smart devices execute to exchange information.

Figure 2:
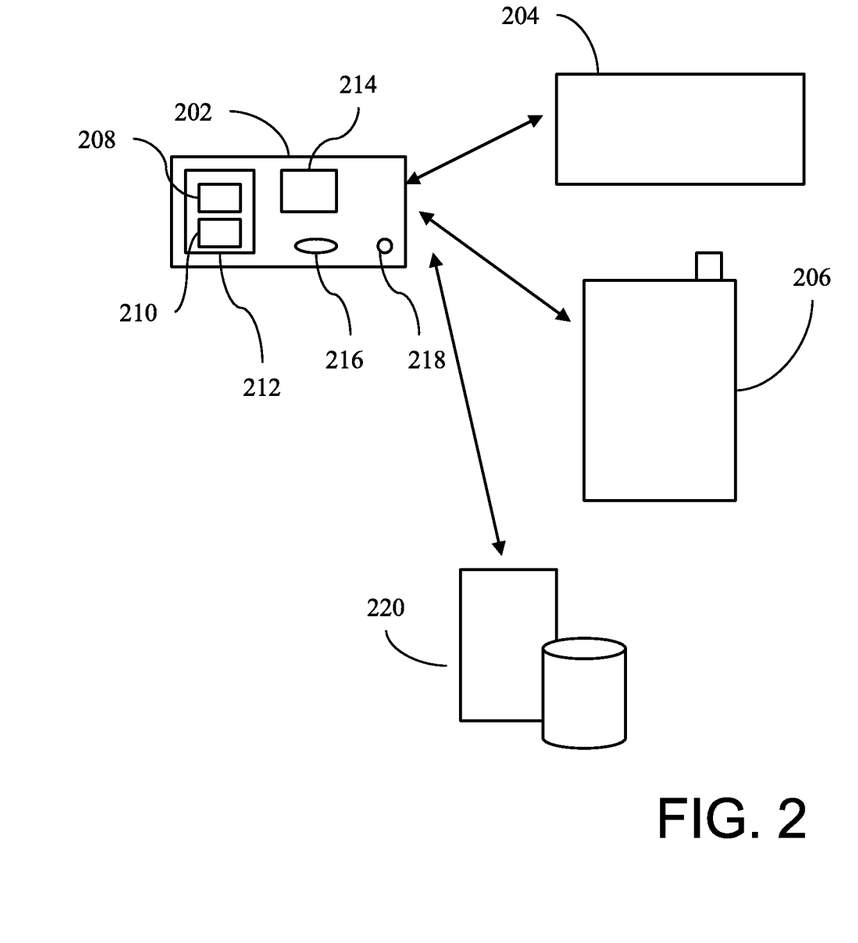
FIG. 2 is a diagram illustrating components of a system in one embodiment.

FIG. 2 is a diagram illustrating components of a system in one embodiment. An electronic card device 202 (also for example, 204) may have a shape of a physical business card (or smart card or pocket-sized card or like sized card) and may be in proximity with another device such as another electronic card device 204 and/or a smartphone device 206. Responsive to the devices, for example, 202 and 204, being in a threshold proximity detectable by sensors of the devices 202 204, the device 202 may pair with device 204, and begin exchanging information wirelessly. For example, the electronic card device 202 may receive information such as contact information associated with the holder of the electronic card device 204. In another aspect, a token with an identifier associated with the holder of the electronic card device 204 may be received, which token may be converted to contact information by another device, for example, by a computer system reading the token and extracting from a database the contact information associated with the token. The computer system may reside on the card, in the cloud, or on another remote computer.

Wireless technology such as Bluetooth may allow for communicating among the devices 202, 204, 206, for example, when at least two of such devices are within sufficient proximity. In addition to, or in lieu of Bluetooth, various other wireless technologies may be used, such as near field communication (NFC), standard WiFi as specified by the IEEE 802.11 protocol, and others. Such wireless technology may allow for pairing of the devices, for example, 202, 204 and exchanging of information.

An electronic card device 202, for example, may be loaded with contact information or other biographical information, which a holder of the electronic card device 202 may want to exchange with others, for example, whom the holder may meet in a conference setting. For instance, information 210 such as contact information, other biographical information, and or a photograph may be loaded onto the electronic card device 202, for possibly exchanging with one or more other devices. In another aspect, a token 208 with a specific identifier may be loaded onto the electronic card device 202, which token is associated with or linked with a record in a remote, possibly cloud-resident, database storing information of the holder.

In one aspect, an electronic card device 202, for instance, may be a smart card embedded with a microchip or integrated circuit (IC) 214 and memory 212. The electronic card device 202 may include a microprocessor executing a program of instructions which function as an agent that can negotiate exchanging of information. For instance, an agent program executing on the microprocessor may determine whether information such as interests of the holder of the electronic card device 202 intersect with information such as interests of a holder of an electronic card device 204 or the like, and when a threshold level of interests intersect, contact information may be exchanged between the devices. The electronic card device 202 may be also configured or programmed to communicate with a host computer 220, and for example, upload information accumulated in the electronic card device 202 to the host computer 220.

Thus, for example, the electronic card device is able to communicate with other such devices, for example, when two of the devices are within sufficient proximity, for instance, as detectable by technology such as Bluetooth. The electronic card device may be associated with an individual and may store or link information such as the individual's contact and biographical information. Responsive to such devices being within sufficient proximity and initiating communication, an agent program executing on the electronic card device, or in the cloud, may negotiate for the exchange of contact and biographical information among the devices, where the negotiation incorporates the current context. The current context, for example, may include a criterion that specifies that an interest of the holder of the electronic card match with an interest identified by said another device (e.g., interest of a holder of said another device). The current context, for example, may also include the current meeting setting such as a conference or meeting, for example, attended by individuals associated with the electronic devices. An electronic card device may verifiably establish that an individual associated with the electronic card is a participant in that meeting or conference, e.g., by querying a database of participants in the meeting, by obtaining or receiving an electronic signal from a badge associated with that meeting, or by other methods. In one example, only the participants or attendees of a conference or meeting may be given such electronic business cards, and therefore, by virtue of coming in contact with another such electronic business card automatically determines that an individual is a fellow meeting or conference attendee.

For instance, an agent program may exchange information responsive to finding that the holders of the devices are participants of a specified conference or meeting and that at least one interest (or a threshold number of interests) of those participants overlap or match. An electronic card may, for example, also store information as such one or more interests of the current holder of that electronic card, and/or download such information from a computer system storing a database of such information In one aspect, a proximity measuring component may be configured to control the behavior of the devices, e.g., automatically powering on the devices when they come in sufficiently close proximity and disengaging their power when they are separated from one another.

In one aspect, the powering on and off is achieved by interlocking magnets on the electronic card device and an accompanying reed switch 216. For instance, electronic card devices with interlocking magnets can turn on one another responsive to being within proximity of one another. In one aspect, the device is configured, using an light emitting diode (LED) 218, to light up upon the beginning of the negotiation (e.g., responsive to the negotiation being initiated), and to turn the light off after a failed negotiation or after the exchange of information is complete (e.g., end of negotiation). Different LED light shading may be employed. For instance, such an LED can be configured to turn yellow at the inception of contact and during the negotiation, and then turn green or red briefly once the negotiation is determined to have been successful or have failed. Different light shadings may be employed. In another aspect, the device is configured to vibrate upon the beginning of the negotiation, and to cease vibrating after a failed negotiation or after the exchange of information is complete.

In one aspect, an electronic card device may be configured to exchange its accumulated contact and biographical information with a paired phone or another device, for example, responsive to determining that the electronic card device and the paired phone or another are in sufficient proximity. The electronic card device or software agent (also referred to above as an agent program) resident on the electronic card device, can negotiate to receive or exchange contact information and/or biographical information of contacts of newly made contacts.

Figure 3:
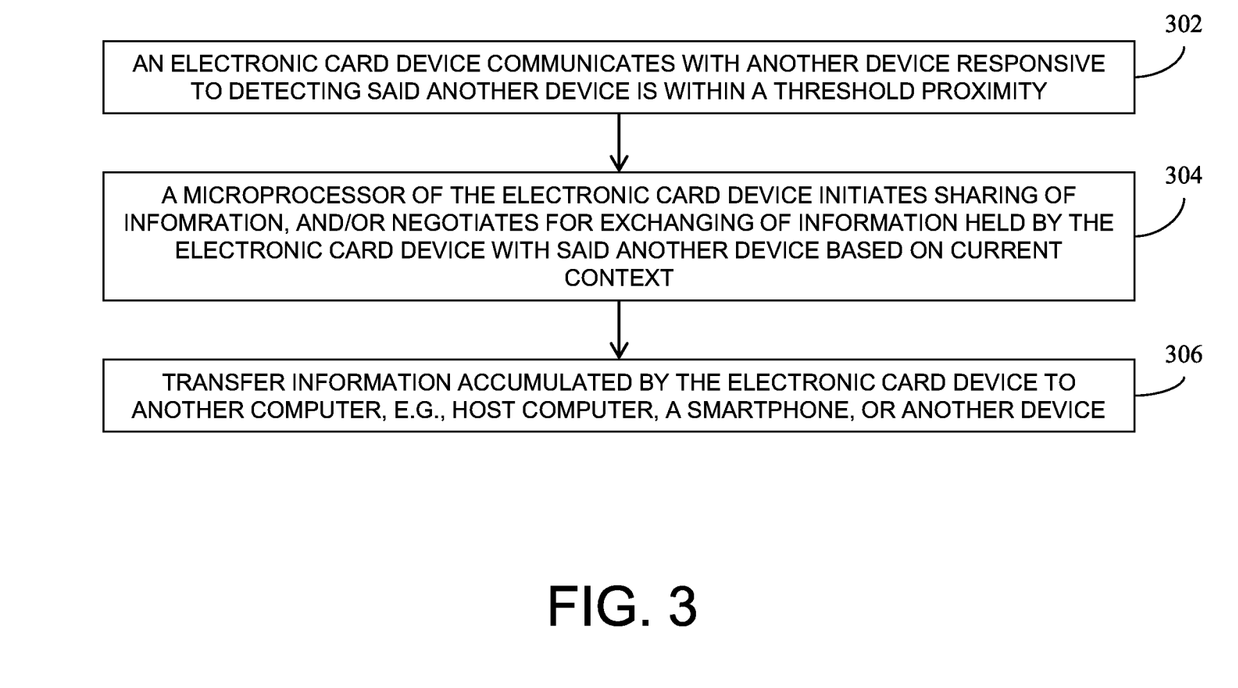
FIG. 3 is a flow diagram illustrating a method in one embodiment.

FIG. 3 is a flow diagram illustrating a method in one embodiment. At 302, the method may include communicating, by an electronic card device comprising an embedded microprocessor and memory with another device responsive to detecting said another device is within threshold proximity. The memory may be loaded with information associated with a holder of the electronic card. At 304, the method may include negotiating by the microprocessor, exchanging of the information with said another device based on current context. The information, for example, may include contact information, biographical information and/or a photograph, and/or other information. In another aspect, the information loadable onto the memory may include a token, wherein the token is linked to a record in a database storing information such as the contact information, biographical information and/or a photograph. The current context may include a criterion that an interest of the holder of the electronic card device match with an interest identified by said another device. The current context may also include a criterion that the holder of the electronic card device and a holder of said another device are participants of a specified conference. At 306, information accumulated in the electronic card device or by the electronic card device, for example, by sharing or exchanging information with other one or more devices which the electronic card device came within proximity for sharing information, may be transferred to another device such as a host computer, a smartphone, or another device. The transfer may be performed by a microprocessor or microcontroller of the electronic card device. In another aspect, a remote agent communicating with the microprocessor or microcontroller may initiate the transfer.

Figure 4:
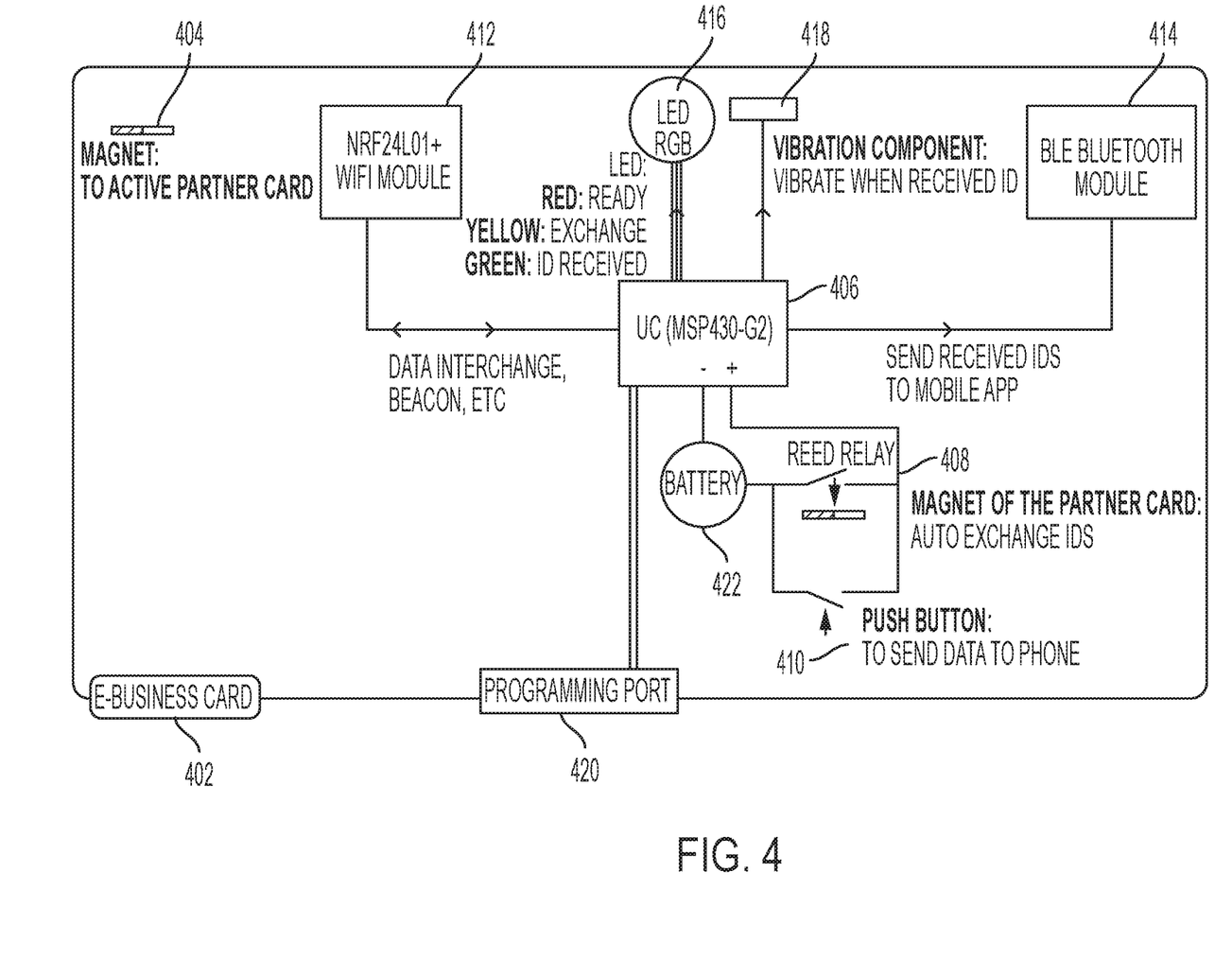
FIG. 4 illustrates a block diagram of an example electronic card device in one embodiment.

FIG. 4 illustrates a block diagram of an example electronic card device in one embodiment. An electronic card device in one embodiment 402 may include a magnet 404, which may active another such electronic card device. A microcontroller 406 such as MSP430-G2 (but not limited to such) may be connected to a switch circuitry such as a Reed Switch 408. The Reed Switch 408 may be activated (goes into higher power mode) responsive to a magnet of another electronic card device being in proximity of the electronic card device 402. Similarly, the Reed Switch 408 may be deactivated (goes into low power mode) when a magnet of another electronic card device is not nearby. A push button 410 may trigger sending data to another device such as a smart or mobile phone or computer. The microcontroller 406 is also coupled with a WiFi module 412 and another wireless module such as a Bluetooth module 414, which allows the electronic card device to communicate with another device. LED component 416 may light up in different shades based on different functions being performed in the electronic card device. For instance, the LED 416 may light up in red may indicate that the device is ready, the LED 416 may light up in yellow may indicate that information is being shared or exchanges, and the LED 416 may light up in green may indicate that an identification has been received. Other light shade coding may be utilized. A vibration component 418 coupled to the microcontroller 406 may vibrate to indicate different functions or modes of the electronic device. For instance, responsive to initiating a negotiation to share or exchange information, the vibration component may vibrate and to cease vibrating after a failed negotiation or after the exchange of information is complete. A programming port 420 allows for programming of the microcontroller, for example, for the microcontroller to function as an agent, which may provide information to another device, receive information from another device, and/or exchange information with another device. The agent may also function to upload the information accumulated from other devices to another device such as a smartphone device and/or another computer system. A battery 422 may provide power to the electronic card device.

Figure 5:
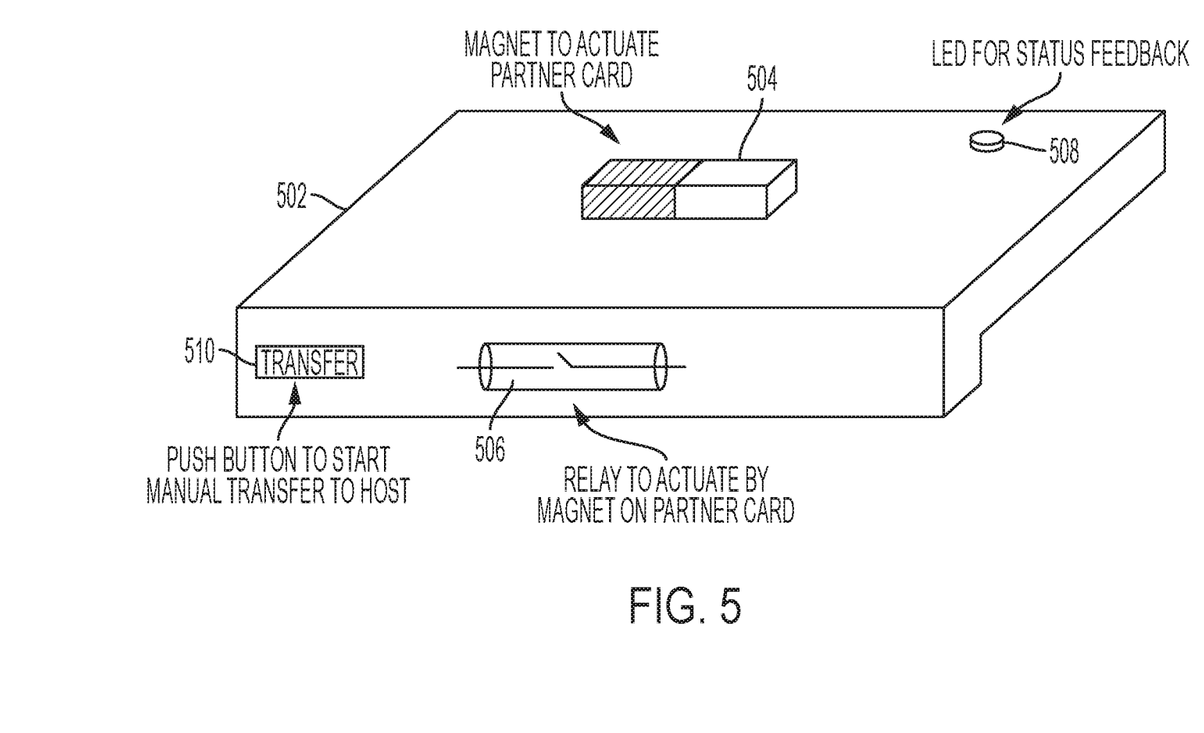
FIG. 5 shows an illustration of a physical electronic card device in one embodiment, for example, shown in FIG. 4.

FIG. 5 shows a physical illustration of an example electronic card device, for example, shown in FIG. 4, in one embodiment. An electronic card device 502 may include a magnet 504, for example, which can actuate another device, for example, implemented with a switch or a relay such as a Reed Switch. The electronic card 502 may also include a relay or a switch 506 such as a Reed Switch, which can be actuated by another device's magnetic field, for example, emanating from that other device's magnet. An LED component 508 may provide status feedback, for instance, as described with reference to FIG. 2. A manual push button 510 may trigger a microcontroller of the electronic card device 502 to transfer data to another computer such as a host computer.

Figure 6:
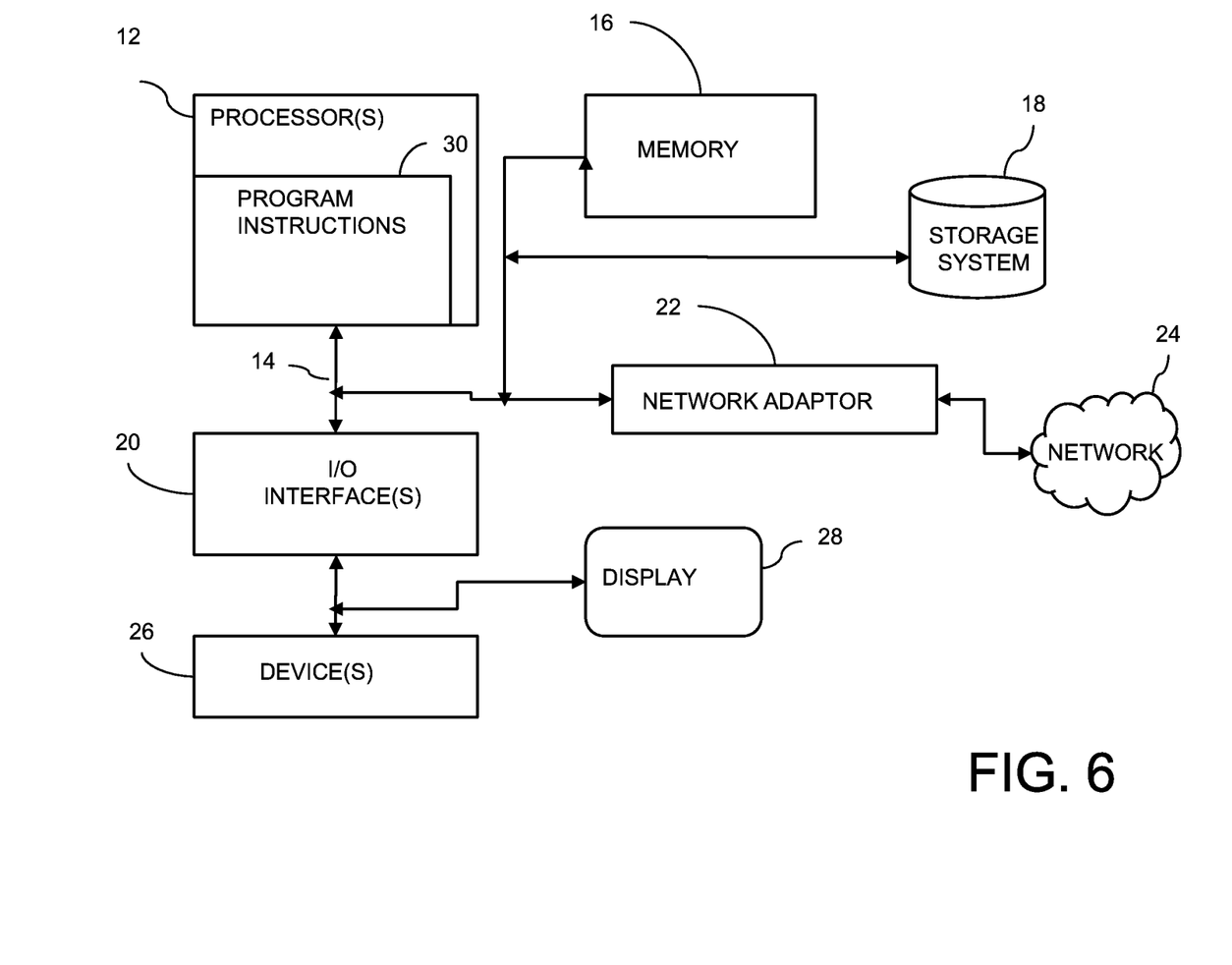
FIG. 6 illustrates a schematic of an example computer or processing system that may implement a computer system, which may work in conjunction with an electronic card device of the present disclosure in one embodiment.

FIG. 6 illustrates a schematic of an example computer or processing system that may implement a computer system, which may work in conjunction with an electronic card device in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30, which may communicate with an electronic card device in facilitating communications of information to other devices, retrieving data or information used in negotiations for information exchange among electronic card devices or the like. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
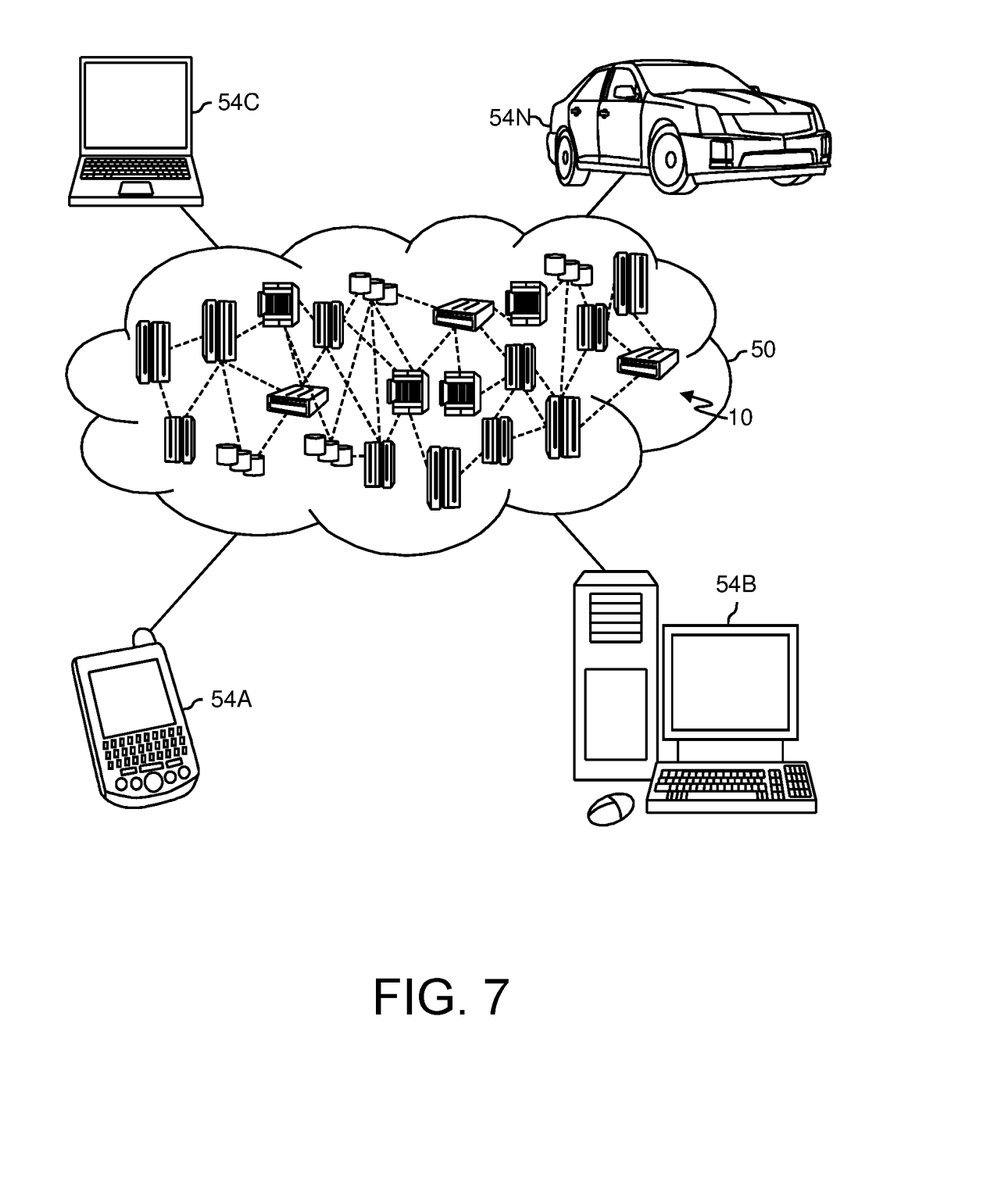
FIG. 7 illustrates a cloud computing environment in one embodiment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
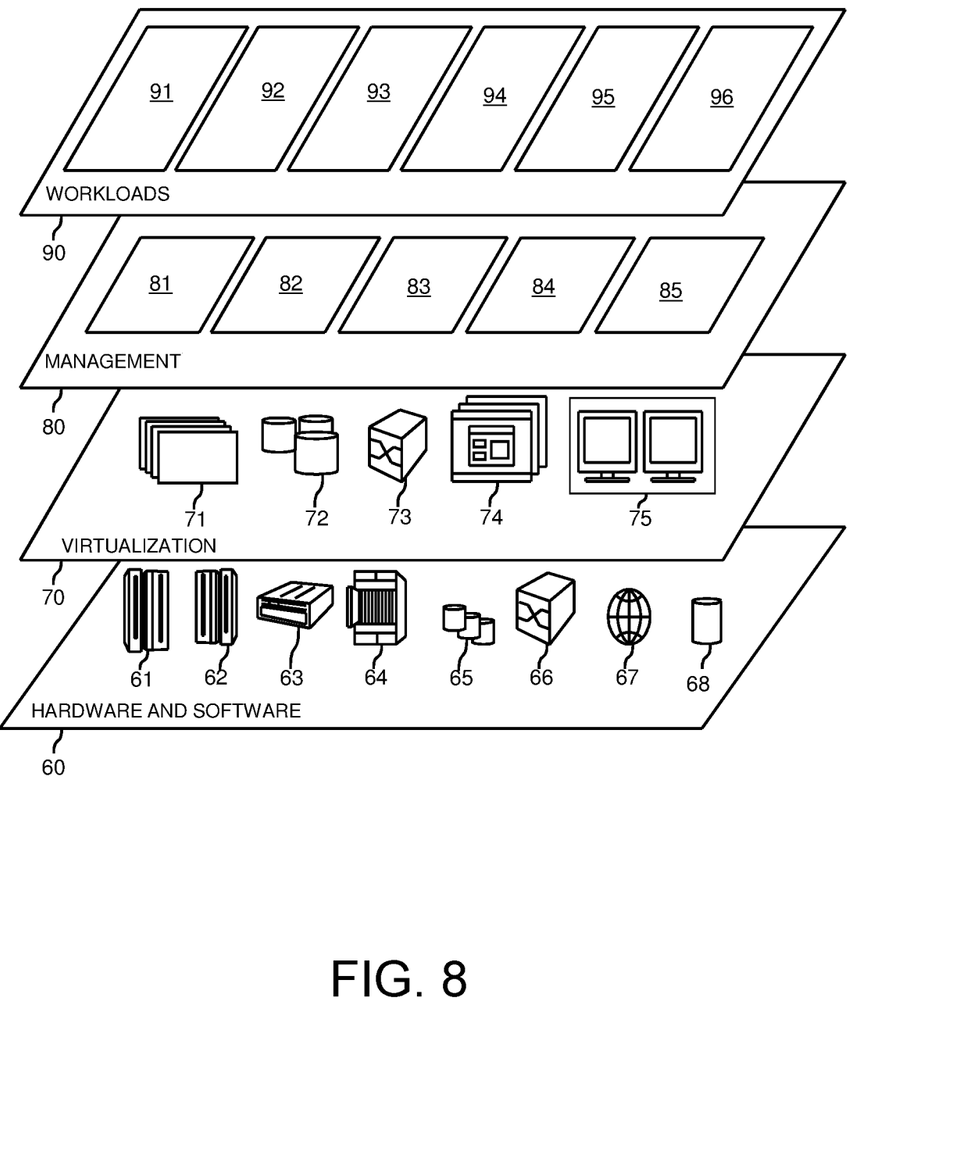
FIG. 8 illustrates a set of functional abstraction layers provided by cloud computing environment in one embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and electronic card device processing 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a first electronic card device comprising an embedded microprocessor and memory wherein the first electronic card device is self-contained;
the memory loadable with information associated with a holder of the first electronic card;
the microprocessor operable to communicate with another device responsive to detecting said another device is within a threshold proximity, wherein said another device is a second electronic card device, which is portable and which is self-contained;
the microprocessor further operable to share at least some of the information with said another device based on current context, wherein the microprocessor is further operable to receive, from said another device, information associated with a new device with which said another device exchanged the information, allowing the holder of the first electronic card to virtually meet a holder of the new device, wherein the new device is a third electronic card, which is portable.

2. The apparatus of claim 1, wherein the microprocessor is further operable to negotiate exchanging of the information with said another device based on the current context.

3. The apparatus of claim 1, wherein the information comprises at least one of contact information, biographical information and a photograph.

4. The apparatus of claim 1, wherein the information loadable onto the memory comprises a token that can be used to access data associated with the holder of the first electronic card.

5. The apparatus of claim 1, wherein the information loadable onto the memory comprises a token, wherein the token is linked to a record in a database storing information comprising at least one of contact information, biographical information and a photograph.

6. The apparatus of claim 1, wherein the current context comprises a criterion that an interest of the holder of the first electronic card device match with an interest identified by said another device.

7. The apparatus of claim 1, wherein the current context comprises that the holder of the first electronic card device and a holder of said another device are participants of at least one of a specified conference and a meeting.

8. The apparatus of claim 1, wherein the first electronic card device is automatically switched to a low-powered mode responsive to being within the threshold proximity with said another device and automatically switched to a higher-powered mode responsive to being outside the threshold proximity with said another device.

9. The apparatus of claim 8, wherein the first electronic card device further comprises interlocking magnets and an accompanying reed switch, which effect the automatic switch of power modes.

10. The apparatus of claim 1, wherein the first electronic card device is configured with a light emitting diode, to light up responsive to initiating the negotiation, and to change light shading after at least one of a failed negotiation and exchanging of information is complete.

11. The apparatus of claim 1, wherein the first electronic card device is configured to vibrate responsive to initiating the negotiation, and to cease vibrating after at least one of a failed negotiation and exchanging of information is complete.

12. The apparatus of claim 1, wherein the first electronic card device is further configured to exchange information accumulated by exchanging information with said another device, with other one or more devices.

13. The apparatus of claim 1, wherein the first electronic card device is further configured to negotiate to exchange information accumulated by exchanging information with said another device, with other one or more devices which come within the threshold proximity.

14. A method comprising:
communicating, by a first electronic card device comprising an embedded microprocessor and memory, wherein the first electronic card device is self-contained, the memory loadable with information associated with a holder of the first electronic card, with another device responsive to detecting said another device is within a threshold proximity wherein said another device is a second electronic card device, which is portable and which is self-contained; and sharing at least some of the information with said another device based on current context, wherein the microprocessor is further operable to receive, from said another device, information associated with a new device with which said another device exchanged the information, allowing the holder of the electronic card to virtually meet a holder of the new device, wherein the new device is a third electronic card, which is portable.

15. The method of claim 14, further comprising negotiating by the microprocessor, for said sharing of the information with said another device based on the current context.

16. The method of claim 14, the information loadable onto the memory comprises a token that can be used to access data associated with the holder of the first electronic card.

17. The method of claim 14, wherein the current context comprises a criterion that an interest of the holder of the first electronic card device match with an interest identified by said another device.

18. The method of claim 14, wherein the current context comprises that the hold of the first electronic card device and a holder of said another device are participants of at least one of a specified conference and a meeting.

19. A computer program product comprising a computer readable storage medium having program instructions embodied therewith, wherein the computer readable storage medium is not a transitory signal per se, the program instructions readable by a device to cause the device to perform a method comprising:
communicating, by a first electronic card device comprising an embedded microprocessor and memory, wherein the first electronic card device is self-contained, the memory loadable with information associated with a holder of the first electronic card, with another device responsive to detecting said another device is within a threshold proximity wherein said another device is a second electronic card device, which is portable and which is self-contained; and sharing at least some of the information with said another device based on current context, wherein the microprocessor is further operable to receive, from said another device, information associated with a new device with which said another device exchanged the information, allowing the holder of the first electronic card to virtually meet a holder of the new device wherein the new device is a third electronic card, which is portable.

20. The method of claim 14, wherein the current context comprises that the hold of the first electronic card device and a holder of said another device are participants of a specified conference and a criterion that an interest of the holder of the first electronic card device match with an interest identified by said another device.

* * * * *